United States Patent
Ayotte et al.

(10) Patent No.: US 12,296,892 B2
(45) Date of Patent: *May 13, 2025

(54) COMMON CHASSIS FOR GROUND SUPPORT TRACTORS

(71) Applicant: Textron Ground Support Equipment Inc., Cartersville, GA (US)

(72) Inventors: Kevin Michael Ayotte, Acworth, GA (US); Micael David Ekstrom, Woodstock, GA (US); Evan Luke Kellams, Marietta, GA (US); Soulaxay Phommavongsa, Acworth, GA (US)

(73) Assignee: Textron Ground Support Equipment Inc., Cartersville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/802,315

(22) Filed: Aug. 13, 2024

(65) Prior Publication Data

US 2025/0083754 A1    Mar. 13, 2025

Related U.S. Application Data

(63) Continuation of application No. 18/244,747, filed on Sep. 11, 2023, now Pat. No. 12,091,098.

(51) Int. Cl.
| | |
|---|---|
| *B62D 33/06* | (2006.01) |
| *B60K 1/04* | (2019.01) |
| *B60K 17/00* | (2006.01) |
| *B60N 2/005* | (2006.01) |
| *B62D 25/14* | (2006.01) |
| *B62D 25/16* | (2006.01) |
| *B64F 1/225* | (2024.01) |

(52) U.S. Cl.
CPC ............ *B62D 33/06* (2013.01); *B60K 1/04* (2013.01); *B60K 17/00* (2013.01); *B60N 2/005* (2013.01); *B62D 25/14* (2013.01); *B62D 25/16* (2013.01); *B64F 1/225* (2013.01)

(58) Field of Classification Search
CPC ........ B62D 33/06; B62D 25/14; B62D 25/16; B60K 1/04; B60K 17/00; B60N 2/005; B60N 2/01; B60L 50/66; B64F 1/225
See application file for complete search history.

(56) References Cited

FOREIGN PATENT DOCUMENTS

| | | |
|---|---|---|
| CN | 207374701 U | 5/2018 |
| CN | 209467036 U | 10/2019 |
| CN | 209634751 U | 11/2019 |
| CN | 209700973 U | 11/2019 |
| CN | 210852690 U | 6/2020 |
| CN | 214001358 U | 8/2021 |

(Continued)

*Primary Examiner* — Jason D Shanske
*Assistant Examiner* — Matthew James O'Neill
(74) *Attorney, Agent, or Firm* — Lawrence Youst PLLC (57) ABSTRACT

A ground support tractor for providing ground support services at an airport. The ground support tractor has a cab forward configuration and a cab aft configuration. The ground support tractor includes a common chassis having a forward mounting location and an aft mounting location. A drivetrain and a battery system are coupled to the common chassis. In the cab forward configuration of the ground support tractor, the battery system is coupled to the aft mounting location and positioned above the drivetrain. In the cab aft configuration of the ground support tractor, the battery system is coupled to the forward mounting location and positioned forward of the drivetrain.

20 Claims, 8 Drawing Sheets

(56) References Cited

FOREIGN PATENT DOCUMENTS

| CN | 115258188 A | 11/2022 |
| CN | 218229452 U | 1/2023 |
| CN | 218616571 U | 3/2023 |

COMMON CHASSIS FOR GROUND SUPPORT TRACTORS

CROSS-REFERENCE TO RELATED APPLICATIONS

The present application is a continuation of co-pending application Ser. No. 18/244,747, filed Sep. 11, 2023, the entire contents of which are hereby incorporated by reference.

TECHNICAL FIELD OF THE DISCLOSURE

The present disclosure relates, in general, to chassis for ground support tractors and, in particular, to a common chassis for a ground support tractor that has a cab forward configuration in which the seat assembly is positioned forward of the battery system and a cab aft configuration in which the seat assembly is positioned aft of the battery system.

BACKGROUND

Ground support tractors, also known as airport tugs or aircraft tugs, are designed to transport and handle diverse types of loads at airports. For example, certain ground support tractors are used to move and tow aircraft on the ground. These ground support tractors are designed to maneuver aircraft safely and efficiently in and out of gates, hangars, runways and other areas of the airport. Such ground support tractors are essential for tasks such as pushing aircraft back from the gate, positioning aircraft for departure and towing aircraft to maintenance or storage areas. As such, these ground support tractors ensure that aircraft are properly positioned and ready for takeoff or maintenance, contributing to the smooth operation of the airport. Other ground support tractors are equipped with specialized attachments, such as cargo loaders or baggage carts that allow them to efficiently move luggage, cargo containers and other types of freight between different areas of the airport, such as the terminal, the cargo hold of an aircraft and airport storage facilities. As such, these ground support tractors help streamline the process of loading, transporting and unloading cargo and baggage.

To minimize delivery times, ground support tractor manufacturers may prefabricate certain subassemblies in anticipation of orders. For example, a manufacturer may gain efficiencies by preassembling the wheeled chassis of their ground support tractors. Due to national standards and customer preferences, however, it has been found that a variety of such wheeled chassis must be maintained in inventory as some customers desire the cab toward the front of the vehicle, in a cab forward configuration, while other customers desire the cab toward the rear of the vehicle, in a cab aft configuration. For manufacturers, having to prefabricate multiple chassis variants not only requires added warehouse space but also necessitates increased capital investment.

SUMMARY

In a first aspect, the present disclosure is directed to a ground support tractor having cab forward and cab aft configurations. The ground support tractor includes a common chassis that has a forward mounting location and an aft mounting location. A seat assembly, a battery system and a plurality of body panels are coupled to the common chassis. In the cab forward configuration, the seat assembly is coupled to the forward mounting location, the battery system is coupled to the aft mounting location and the body panels are positioned in a cab forward orientation. In the cab aft configuration, the seat assembly is coupled to the aft mounting location, the battery system is coupled to the forward mounting location and the body panels are positioned in a cab aft orientation.

In certain embodiments, the seat assembly may be higher in the cab aft configuration than in the cab forward configuration. In some embodiments, an operator tub may be coupled to the common chassis. In such embodiments, in the cab forward configuration, the operator tub may be coupled to the forward mounting location and, in the cab aft configuration, the operator tub may be coupled to the aft mounting location. In certain embodiments, the operator tub may be a common operator tub. In some embodiments, the seat assembly may be coupled to the operator tub. In certain embodiments, a dash frame may be coupled to the operator tub. In some embodiments, the dash frame may be a common dash frame. In certain embodiments, in the cab forward configuration, a forward frame extension may be coupled to the common chassis. In such embodiments, the operator tub may be coupled to the forward frame extension.

In some embodiments, the common chassis may include a frame with first and second forward wheel wells coupled thereto and with first and second aft wheel wells coupled thereto. In such embodiments, the forward mounting location may be positioned above the first and second forward wheel wells and the aft mounting location may be positioned above the first and second aft wheel wells. In certain embodiments, in the cab forward configuration, the seat assembly may be positioned above the first and second forward wheel wells and, in the cab aft configuration, the seat assembly may be positioned above the first and second aft wheel wells. In some embodiments, in the cab forward configuration, the battery system may be positioned above the first and second aft wheel wells and, in the cab aft configuration, the battery system may be positioned above the first and second forward wheel wells. In certain embodiments, first and second steering control wheels may be respectively positioned within the first and second forward wheel wells. In addition, first and second drive wheels may be respectively positioned within the first and second aft wheel wells. In such embodiments, in the cab forward configuration, the seat assembly may be positioned above the first and second steering control wheels and, in the cab aft configuration, the seat assembly may be positioned above the first and second drive wheels. In some embodiments, in the cab forward configuration, the battery system may be positioned above the first and second drive wheels and, in the cab aft configuration, the battery system may be positioned above the first and second steering control wheels.

In certain embodiments, the seat assembly may be a common seat assembly. In some embodiments, the battery system may be a common battery system. In certain embodiments, the plurality of body panels may include at least one common body panel and at least some body panels that are not common to the cab forward configuration and the cab aft configuration. In some embodiments, a drivetrain may be coupled to the common chassis such that, in the cab forward configuration, the battery system is positioned above the drivetrain and, in the cab aft configuration, the battery system is positioned forward of the drivetrain.

In a second aspect, the present disclosure is directed to a ground support tractor that has cab forward and cab aft configurations. The ground support tractor includes a common chassis formed from a frame with first and second forward wheel wells coupled thereto and with first and second aft wheel wells coupled thereto. The common chassis has a forward mounting location positioned above the first and second forward wheel wells and an aft mounting location positioned above the first and second aft wheel wells. A common seat assembly and a common battery system are coupled to the common chassis. First and second steering control wheels are respectively positioned within the first and second forward wheel wells. First and second drive wheels are respectively positioned within the first and second aft wheel wells. In the cab forward configuration, the common seat assembly is coupled to the forward mounting location and the common battery system is coupled to aft mounting location. In the cab aft configuration, the common seat assembly is coupled to the aft mounting location and the common battery system coupled to forward mounting location.

In certain embodiments, a common operator tub may be coupled to the common chassis with a common dash frame coupled to the common operator tub. In such embodiments, in the cab forward configuration, the common operator tub may be coupled to the forward mounting location and, in the cab aft configuration, the common operator tub may be coupled to the aft mounting location. In some embodiments, a common drivetrain may be coupled to the common chassis such that, in the cab forward configuration, the common battery system is positioned above the common drivetrain and, in the cab aft configuration, the common battery system is positioned forward of the common drivetrain.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1:
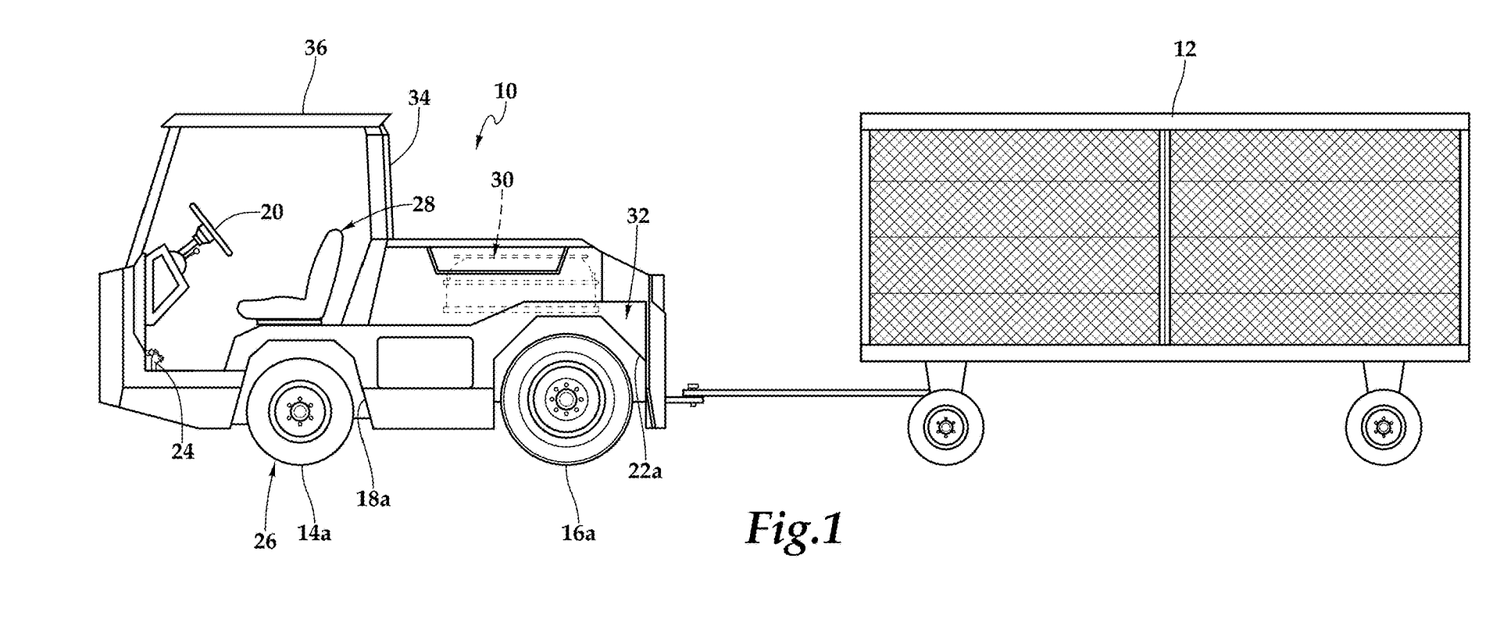
FIG. 1 is a schematic illustration of a ground support tractor having a common chassis that is towing a cargo container in accordance with embodiments of the present disclosure.

Referring to FIG. 1 in the drawings, a land vehicle depicted as a ground support tractor is schematically illustrated and generally designated 10. In the illustrated embodiment, ground support tractor 10 is towing a load depicted as a cargo container 12 at an airport, such as between the terminal and a cargo hold of an aircraft. Ground support tractor 10 is a wheeled vehicle that includes a pair of front steering control wheels 14a, 14b (see also FIG. 3A) and a pair of aft drive wheels 16a, 16b. Front steering control wheels 14a, 14b of ground support tractor 10 are respectively positioned within front wheel wells 18a, 18b which are sized to allow rotation and turning of front steering control wheels 14a, 14b therein to control the direction of travel of ground support tractor 10 when ground support tractor 10 is moving. Ground support tractor 10 includes a steering system coupled to front steering control wheels 14a, 14b including a steering controller 20 that is operably coupled to front steering control wheels 14a, 14b such that rotation of steering controller 20 causes front steering control wheels 14a, 14b to turn. Aft drive wheels 16a, 16b of ground support tractor 10 are respectively positioned within aft wheel wells 22a, 22b which are sized to allow rotation of aft drive wheels 16a, 16b therein to control the movement of ground support tractor 10.

Ground support tractor 10 includes motion controllers 24 depicted as pedals for accelerating and stopping ground support tractor 10. The accelerator pedal is operably coupled to a powertrain of ground support tractor 10 that provides torque to aft drive wheels 16a, 16b. The brake pedal is operably coupled to a brake system that is coupled to front steering control wheels 14a, 14b and/or aft drive wheels 16a, 16b to stop the motion of ground support tractor 10. In the illustrated embodiment, the vehicle controls are depicted on the left side of ground support tractor 10 such that ground support tractor 10 is configured to have the driver on the left side of the vehicle, thus defining the left side of ground support tractor 10 as the driver side and the right side of ground support tractor 10 as the passenger side. In other embodiments, the vehicle controls may be positioned on the right side of a ground support tractor.

Structural support for ground support tractor 10 includes a chassis, depicted as wheeled chassis 26, on or around which the various components of ground support tractor 10 are assembled. In the illustrated embodiment, ground support tractor 10 has been assembled in a cab forward configuration wherein a seat assembly 28 is coupled to wheeled chassis 26 in a forward mounting location that is above front wheel wells 18a, 18b and front steering control wheels 14a, 14b, a battery system 30 is coupled to wheeled chassis 26 in an aft mounting location that is above aft wheel wells 22a, 22b and aft drive wheels 16a, 16b, and body panels 32 of ground support tractor 10 are positioned in a cab forward orientation. As discussed herein, ground support tractor 10 can alternatively be assembled in a cab aft configuration wherein seat assembly 28 is coupled to wheeled chassis 26 in the aft mounting location that is above aft wheel wells 22a, 22b and aft drive wheels 16a, 16b, battery system 30 is coupled to wheeled chassis 26 in the forward mounting location that is above front wheel wells 18a, 18b and front steering control wheels 14a, 14b and body panels 32 of ground support tractor 10 are positioned in a cab aft orientation. In the illustrated embodiments, ground support tractor 10 includes a cabin 34 having a roof 36 that provides protection for the operators of ground support tractor 10 and the components within cabin 34.

The present embodiments teach a wheeled chassis that is common to a ground support tractor having a cab forward orientation and a ground support tractor having a cab aft orientation. Wheeled chassis 26 may accordingly be referred to as a common chassis or a common wheeled chassis as it can be preassembled for use in either a cab forward configuration or a cab aft configuration of a ground support tractor. The present embodiments therefore provide a manufacturer with efficiency gains, reduced warehouse requirements and lower capital investments as only a single version of the wheeled chassis needs to be prefabricated in anticipation of orders, even when some customers desire ground support tractors in the cab forward configuration while other customers desire ground support tractors in the cab aft configuration.

Figure 2A:
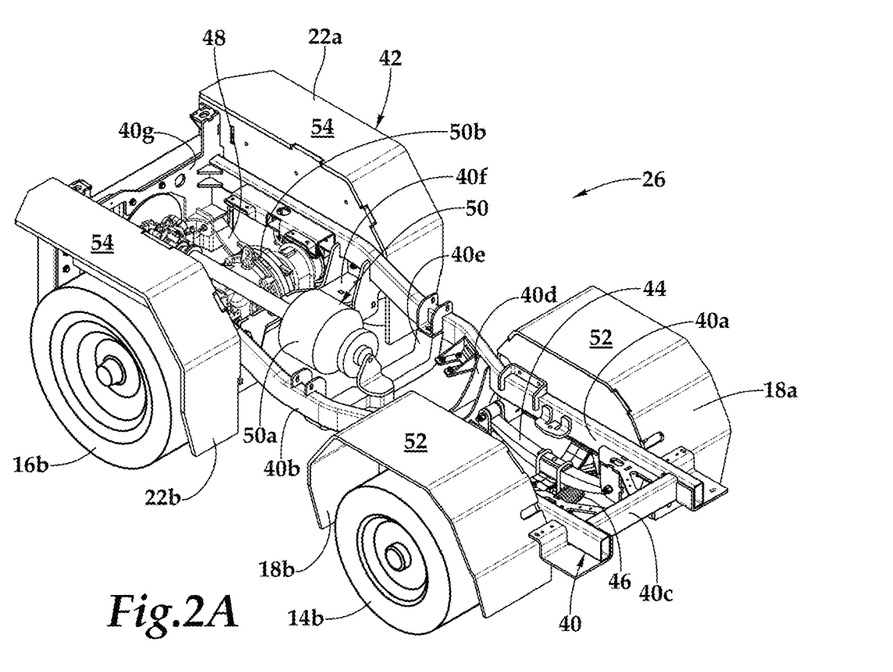
FIGS. 2A-2G are sequential isometric views of a ground support tractor having a common chassis in a cab aft configuration that is depicted in various states of assembly in accordance with embodiments of the present disclosure.

Referring next to FIG. 2A of the drawings, a common wheeled chassis 26 will now be described in greater detail. Common wheeled chassis 26 is formed of a plurality of structural members that are interconnected by welds, bolts and/or other suitable fastening means. The structural members include a frame assembly 40 and a plurality of plate members 42 comprised of metal or metal alloy, such as steel or aluminum. Frame assembly 40 includes a left beam 40a, a right beam 40b, a front mounting rail 40c, a front suspension mount 40d, a motor mount 40e, an aft suspension mount 40f and an aft hitch plate 40g. Plate members 42 form front wheel wells 18a, 18b and aft wheel wells 22a, 22b each of which is coupled to frame assembly 40. A front suspension 44, depicted as leaf springs, is mounted between front mounting rail 40c and a front suspension mount 40d with a steering rack 46 coupled to front suspension 44. A rear suspension 48, depicted as leaf springs, is coupled between aft suspension mount 40f and an aft hitch plate 40g. In the illustrated embodiment, a drivetrain 50, depicted as including an electric motor 50a and a transaxle 50b, is coupled between motor mount 40e and rear suspension 48. Transaxle 50b is operably coupled to the drive axles that provide torque to aft drive wheels 16a, 16b.

In the illustrated embodiment, the generally horizontally oriented upper plates of front wheel wells 18a, 18b together form a forward mounting location 52 of common wheeled chassis 26. Likewise, the generally horizontally oriented upper plates of aft wheel wells 22a, 22b together form an aft mounting location 54 of common wheeled chassis 26. As discussed herein, forward mounting location 52 and aft mounting location 54 are each configured to receive and support multiple different subassemblies thereon such that a ground support tractor constructed using common wheeled chassis 26 may be either a cab forward ground support tractor or a cab aft ground support tractor. According to one embodiment of the present disclosure, a subassembly including frame assembly 40, front wheel wells 18a, 18b, aft wheel wells 22a, 22b, front suspension 44, steering rack 46, rear suspension 48, drivetrain 50, front steering control wheels 14a, 14b and aft drive wheels 16a, 16b can be prefabricated to form common wheeled chassis 26 which is suitable for use in either a cab forward configuration or a cab aft configuration of a ground support tractor. In other embodiments, a common wheeled chassis may include additional components, different components or fewer components. For example, it may be desirable to prefabricate a common wheeled chassis without one or more of the powertrain components being preinstalled. Once preassembled, common wheeled chassis 26 may be stored as inventory in anticipation of orders for either cab forward or cab aft ground support tractors such that common wheeled chassis 26 is readily available as a starting subassembly for new builds upon request.

Figure 2B:
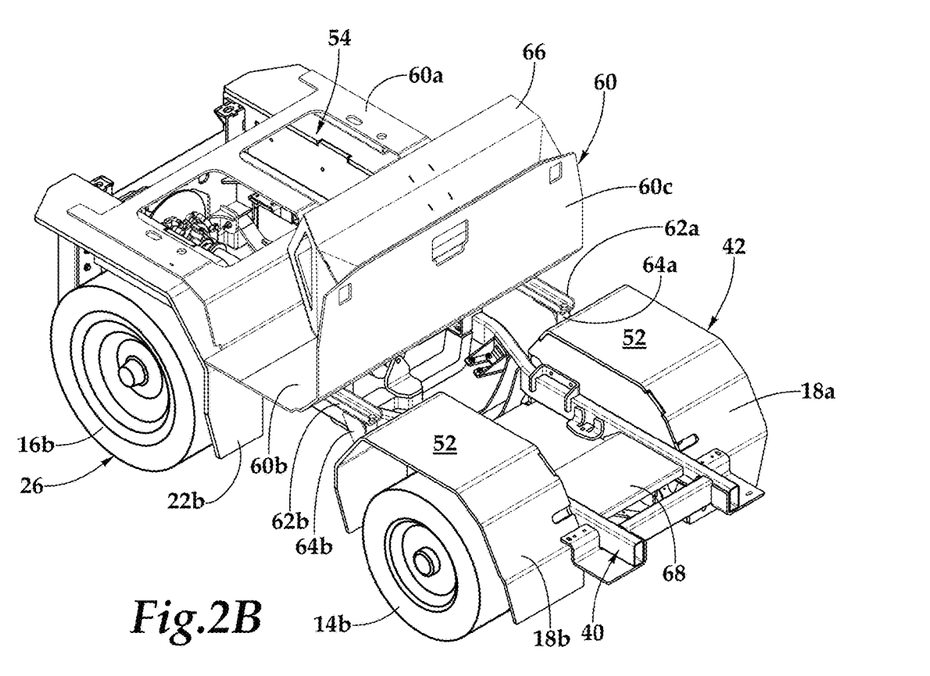

Referring to FIGS. 2A-2G of the drawings, additional components will sequentially be added to common wheeled chassis 26 to build a ground support tractor having a cab aft configuration. Starting with common wheeled chassis 26 of FIG. 2A, an operator tub 60 has been installed between aft mounting location 54 of common wheeled chassis 26 and front wheel wells 18a, 18b, as best seen in FIG. 2B. Operator tub 60 is preferably a single integral plate member but could alternatively be formed from multiple plate sections that are coupled together or separately coupled to common wheeled chassis 26. Operator tub 60 is comprised of metal or metal alloy, such as steel or aluminum. In the illustrated embodiment, operator tub 60 include a generally horizontally extending aft plate 60a, a cabin floor 60b and a generally vertically extending forward plate 60c. Aft plate 60a is coupled to aft mounting location 54 at the upper plates of aft wheel wells 22a, 22b using bolts or other suitable fastening means. Forward mounting rails 62a, 62b are respectively coupled to aft portions of front wheel wells 18a, 18b via mounting brackets 64a, 64b. A dash frame 66 is coupled forward plate 60c using bolts or other suitable fastening means. A forward cover plate 68 has been installed between left and right beams 40a, 40b above front suspension 44.

Figure 2C:
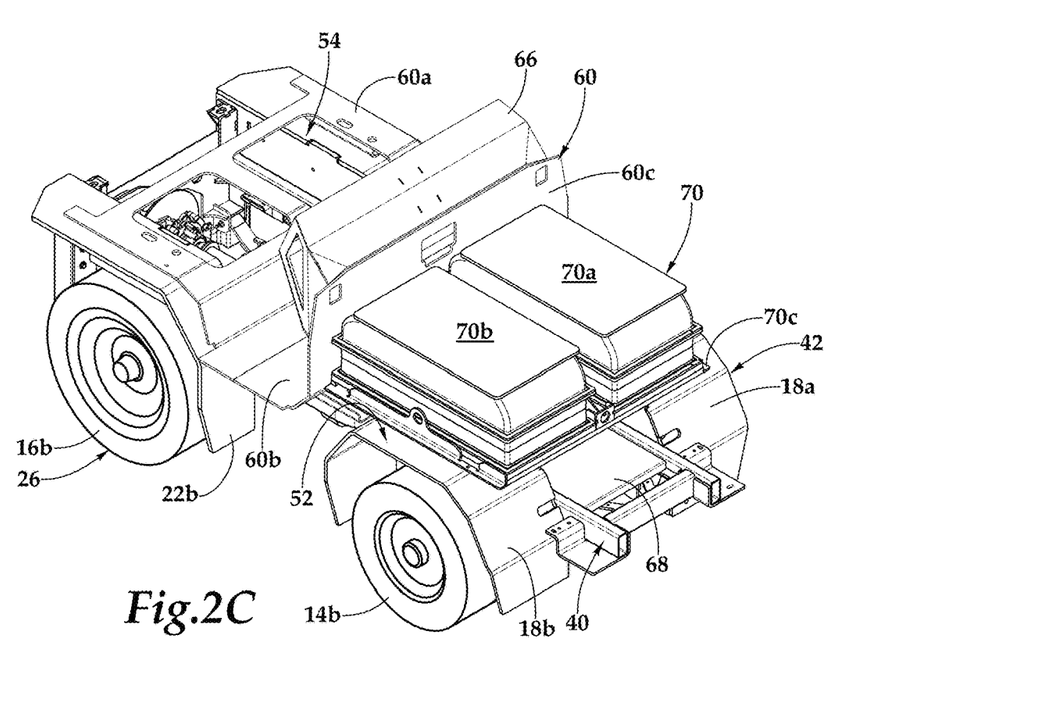

Referring to FIG. 2C of the drawings, a battery system 70 has been installed at forward mounting location 52 of common wheeled chassis 26. Battery system 70 including battery packs 70a, 70b that are mounted on a battery rack 70c. In the illustrated embodiment, battery packs 70a, 70b are operably coupled to drivetrain 50 to form the powertrain of the ground support tractor. In other embodiments, the powertrain of a ground support tractor may include an internal combustion engine and a transmission. Battery packs 70a, 70b provide the energy necessary to power electric motor 50a and thus the movement of the ground support tractor as well as the various electronic components thereof. Battery rack 70c is coupled to forward mounting location 52 at the upper plates of forward wheel wells 18a, 18b using bolts or other suitable fastening means to secure battery packs 70a, 70b to wheeled chassis 26 above front wheel wells 18a, 18b and front steering control wheels 14a, 14b.

Figure 2D:
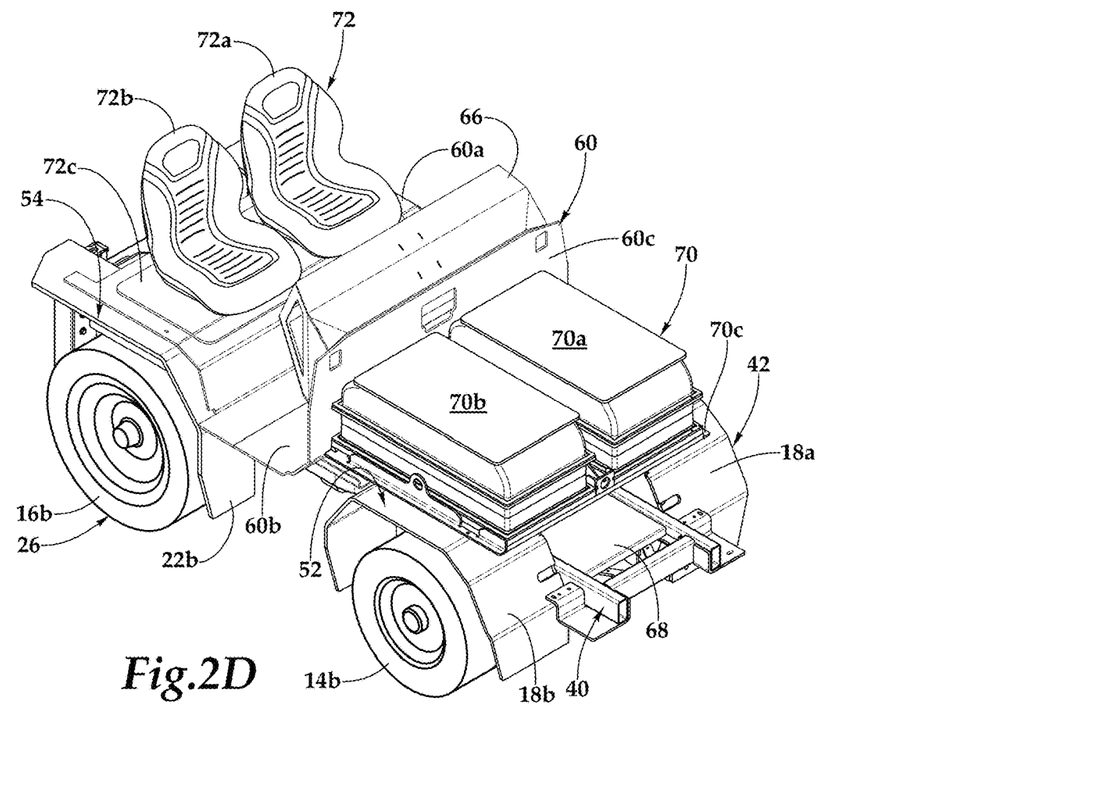

Referring to FIG. 2D of the drawings, a seat assembly 72 has been installed at aft mounting location 54 of common wheeled chassis 26. Seat assembly 72 including a driver seat 72a, a passenger seat 72b and a seat frame 72c. In the illustrated embodiments, seat frame 72c is coupled to aft plate 60a of operator tub 60 and/or the upper plates of aft wheel wells 22a, 22b using bolts or other suitable fastening means to secure driver seat 72a and passenger seat 72b to common wheeled chassis 26 above aft wheel wells 22a, 22b and aft drive wheels 16a, 16b. In other embodiment, seat assembly 72 may include a driver seat 72a and a passenger seat 72b that are individually coupled to aft plate 60a of operator tub 60 and/or the upper plates of aft wheel wells 22a, 22b.

Figure 2E:
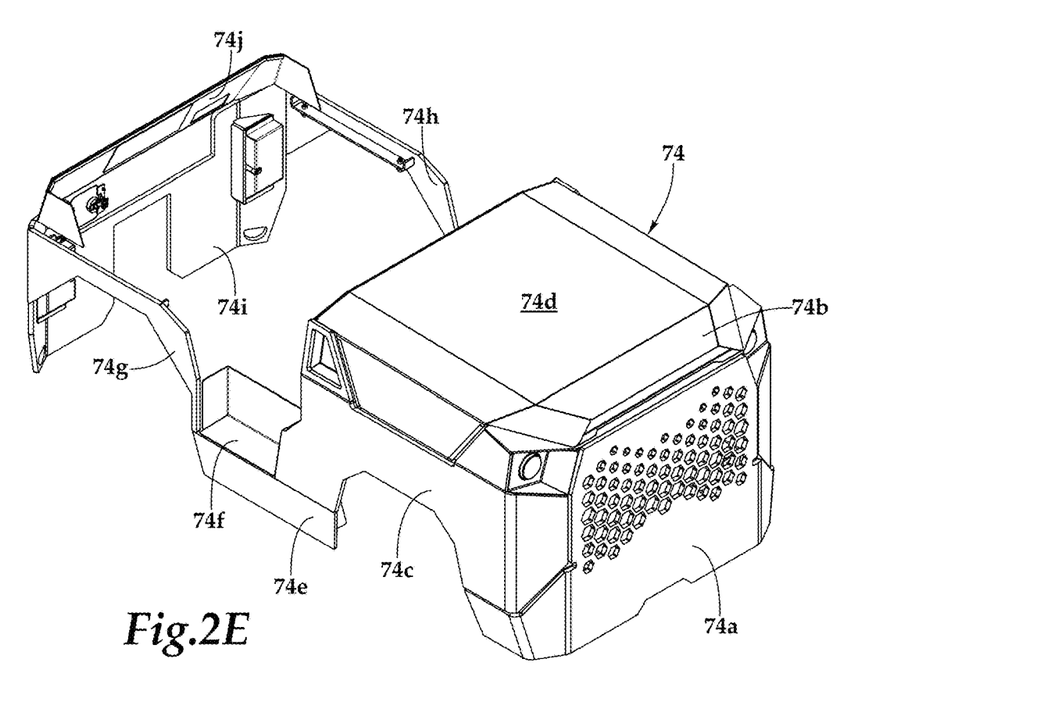
Figure 2F:
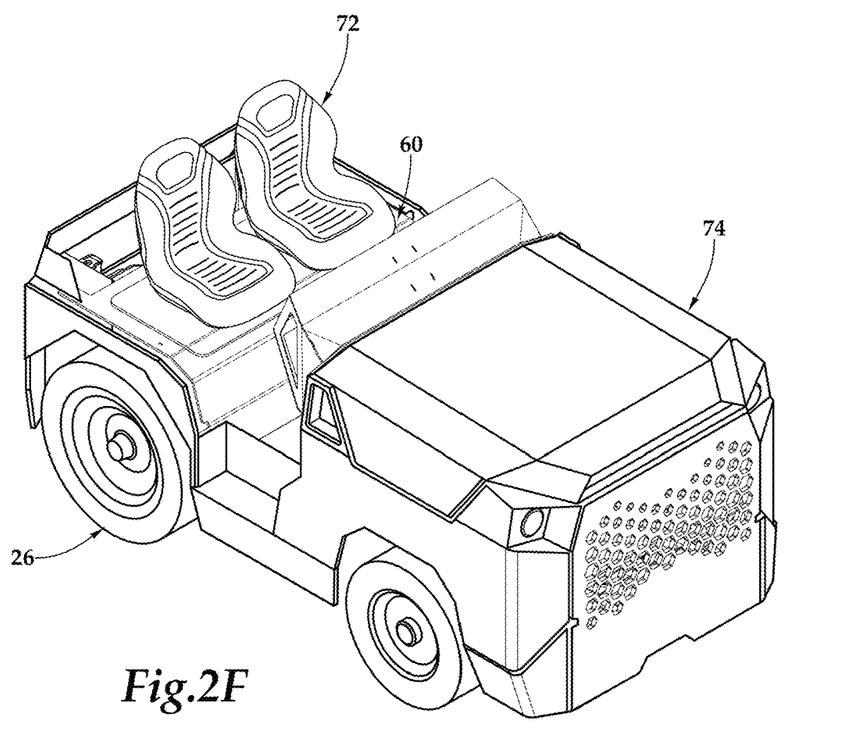
Figures 2G, 3G:
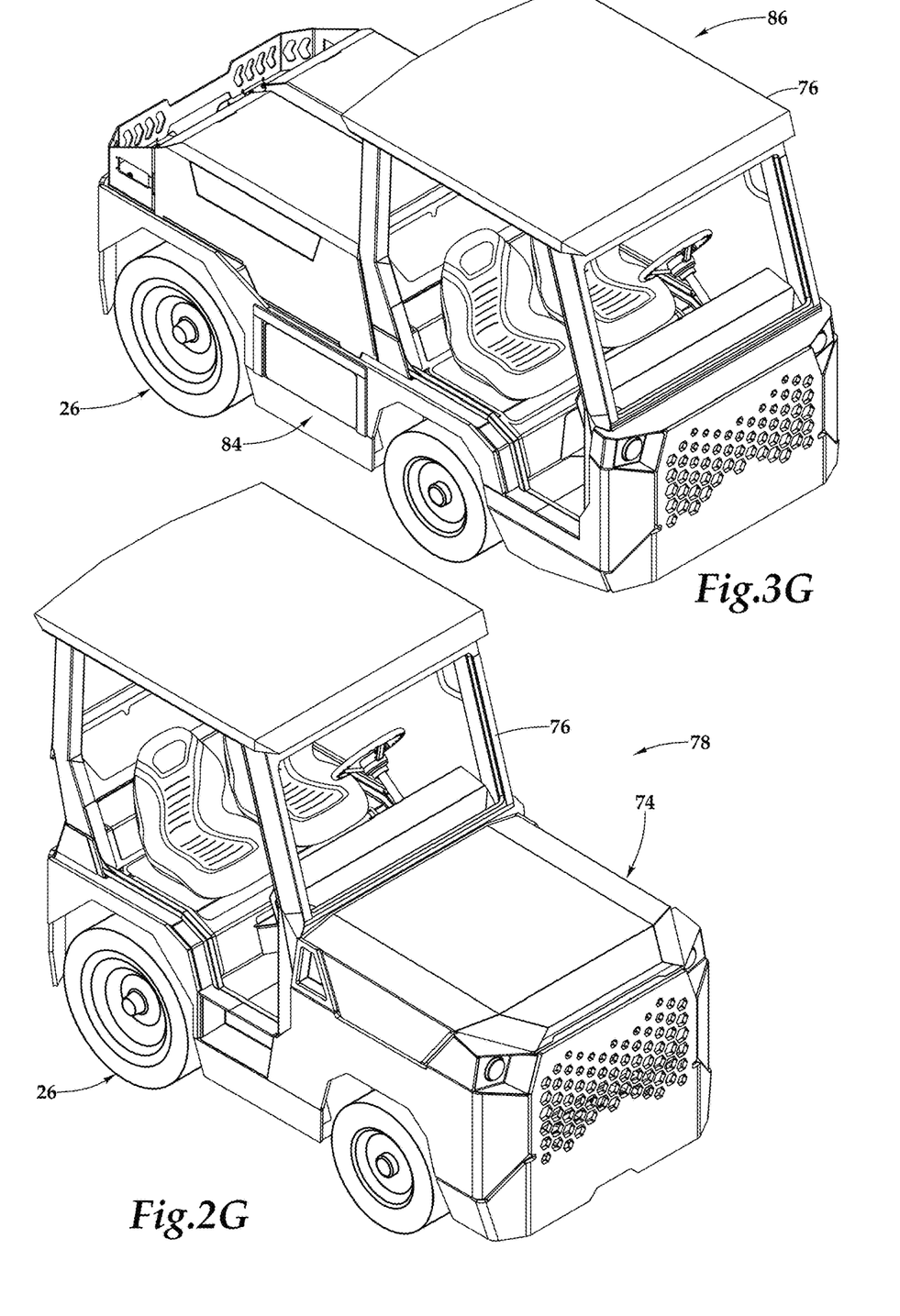
FIGS. 3A-3G are sequential isometric views of a ground support tractor having a common chassis in a cab forward configuration that is depicted in various states of assembly in accordance with embodiments of the present disclosure.

Referring to FIG. 2E of the drawings, details of body panels 74 positioned in a cab aft orientation will now be described. In the illustrated embodiments, body panels 74 include a front bumper 74a, a headlight bezel 74b, a right front fender 74c, a left front fender (not visible), a hood 74d, a right side skirt 74e, a left side skirt (not visible), a right cab step 74f, a left cab step (not visible), a right rear fender 74g, a left rear fender 74h, a rear bumper 74i and a service access panel 74j. Each of body panels 74 is preferably a single integral plate member but could alternatively be formed from multiple plate sections that are coupled together or separately coupled to common wheeled chassis 26. As another alternative, more than one of the recited body panels 74 could be formed as a single integral plate member. Body panel 74 are comprised of metal or metal alloy, such as steel or aluminum. As best seen in FIG. 2F of the drawings, body panels 74 are coupled to common wheeled chassis 26 using bolts or other suitable fastening means to provide an outer skin for the ground support tractor that protects the various operating components of the ground support tractor disposed therein. As best seen in FIG. 2G of the drawings, a cabin 76 has been installed on common wheeled chassis 26 which completes the assembly of a ground support tractor 78 having a cab aft configuration.

Even though the assembly of ground support tractor 78 having a cab aft configuration has been described and depicted as progressing in a certain sequence, it should be understood by those having ordinary skill in the art that the subassemblies of a ground support tractor may be assembled in a variety of sequences. For example, even though FIGS. 2B-2C depict installation of operator tub 60 prior to battery system 70, it should be understood by those having ordinary skill in the art that the battery system of ground support tractor could alternatively be installed prior to installation of the operator tub. Likewise, even though FIGS. 2D-2F depict installation of seat assembly 72 prior to body panels 74, it should be understood by those having ordinary skill in the art that the body panels of ground support tractor could alternatively be installed prior to installation of the seat assembly. Accordingly, it is to be understood by those having ordinary skill in the art that the assembly sequences depicted and described herein are merely for illustrative purposes and are not intended to define an actual assembly process.

Figure 3A:
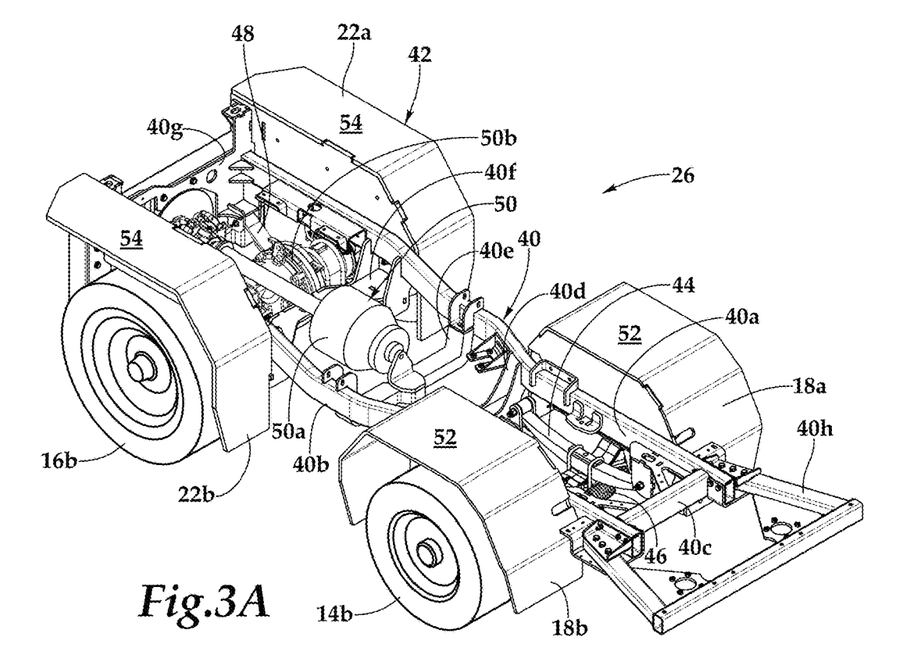
Figure 3B:
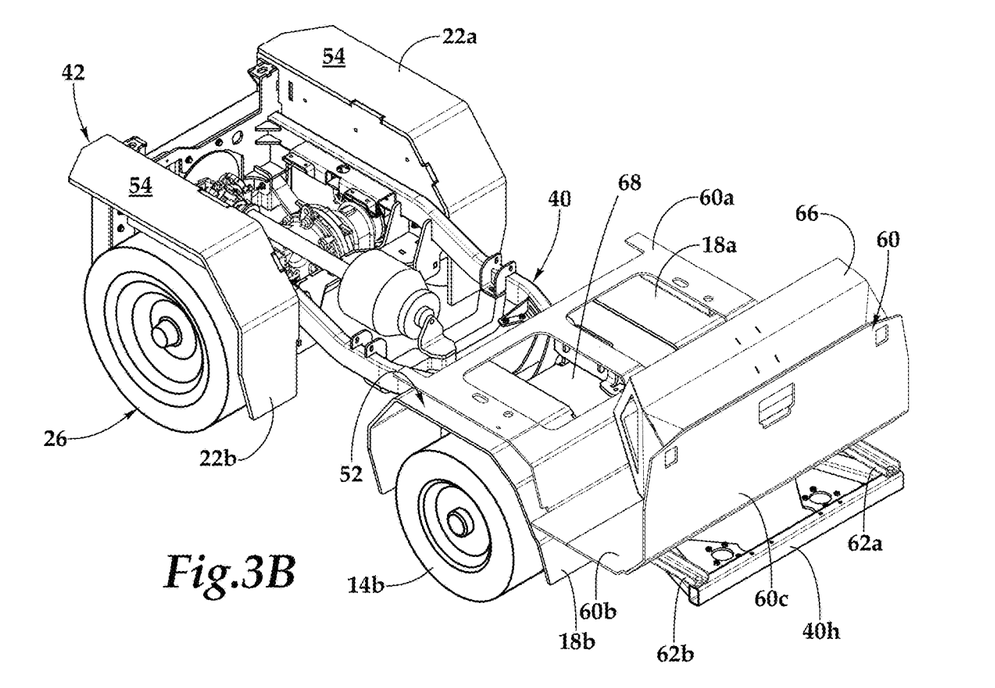

Referring to FIGS. 3A-3G of the drawings, components will sequentially be added to common wheeled chassis 26 to build a ground support tractor having a cab forward configuration. As discussed herein, a subassembly including frame assembly 40, front wheel wells 18a, 18b, aft wheel wells 22a, 22b, front suspension 44, steering rack 46, rear suspension 48, drivetrain 50, front steering control wheels 14a, 14b and aft drive wheels 16a, 16b can be prefabricated to form common wheeled chassis 26 which is suitable for use in a cab forward configuration of a ground support tractor. Referring to FIG. 3A of the drawings, a front frame extension 40h has been installed on common wheeled chassis 26. Referring to FIG. 3B of the drawings, operator tub 60 has been installed between forward mounting location 52 of common wheeled chassis 26 and front frame extension 40h. As operator tub 60 may be installed for the cab forward configuration or the cab aft configuration of a ground support tractor, operator tub 60 may be referred to as a common operator tub. Aft plate 60a of operator tub 60 is coupled to forward mounting location 52 at the upper plates of forward wheel wells 18a, 18b using bolts or other suitable fastening means. Forward mounting rails 62a, 62b of operator tub 60 are coupled to front frame extension 40h. A dash frame 66 is coupled forward plate 60c using bolts or other suitable fastening means. As dash frame 66 may be installed for the cab forward configuration or the cab aft configuration of a ground support tractor, dash frame 66 may be referred to as a common dash frame.

Figure 3C:
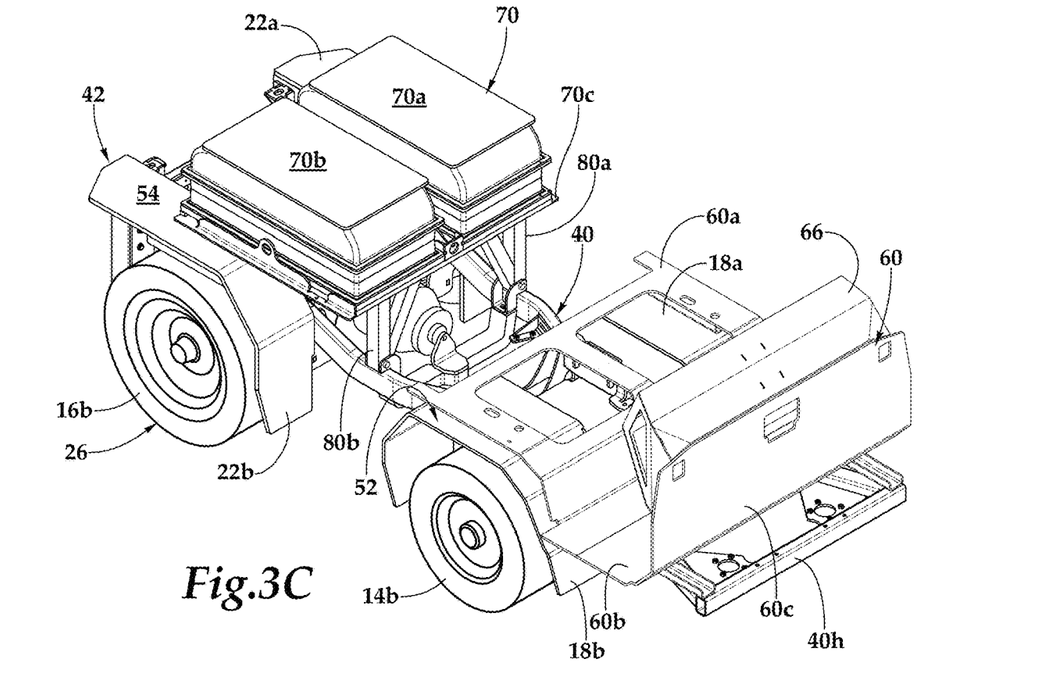
Figure 3D:
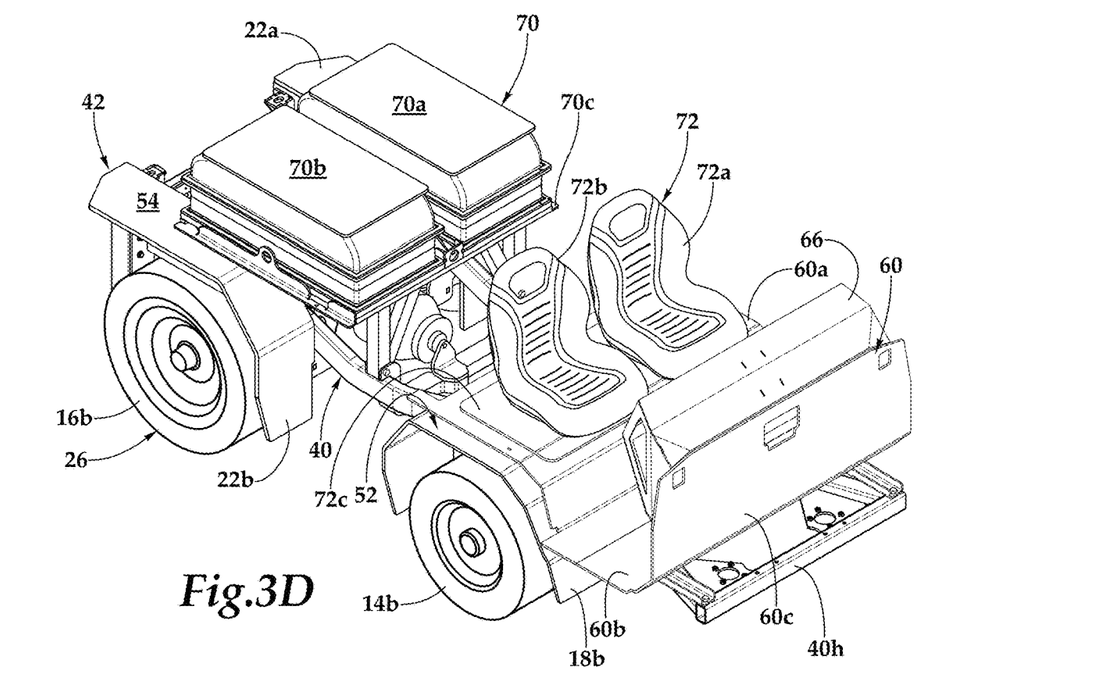

Referring to FIG. 3C of the drawings, battery system 70 has been installed between aft mounting location 54 and frame assembly 40 of common wheeled chassis 26. More specifically, battery rack 70c is coupled to aft mounting location 54 at the upper plates of aft wheel wells 22a, 22b and is coupled to frame assembly 40 via pillars 80a, 80b using bolts or other suitable fastening means to secure battery packs 70a, 70b to wheeled chassis 26 above aft wheel wells 22a, 22b and aft drive wheels 16a, 16b. As battery system 70 may be installed for the cab forward configuration or the cab aft configuration of a ground support tractor, battery system 70 may be referred to as a common battery system. Referring to FIG. 3D of the drawings, seat assembly 72 has been installed at forward mounting location 52 of common wheeled chassis 26. In the illustrated embodiments, seat frame 72c is coupled to aft plate 60a of operator tub 60 and/or the upper plates of forward wheel wells 18a, 18b using bolts or other suitable fastening means to secure driver seat 72a and passenger seat 72b to common wheeled chassis 26 above front wheel wells 18a, 18b and front steering control wheels 14a, 14b. As seat assembly 72 may be installed for the cab forward configuration or the cab aft configuration of a ground support tractor, seat assembly 72 may be referred to as a common seat assembly.

Figure 3E:
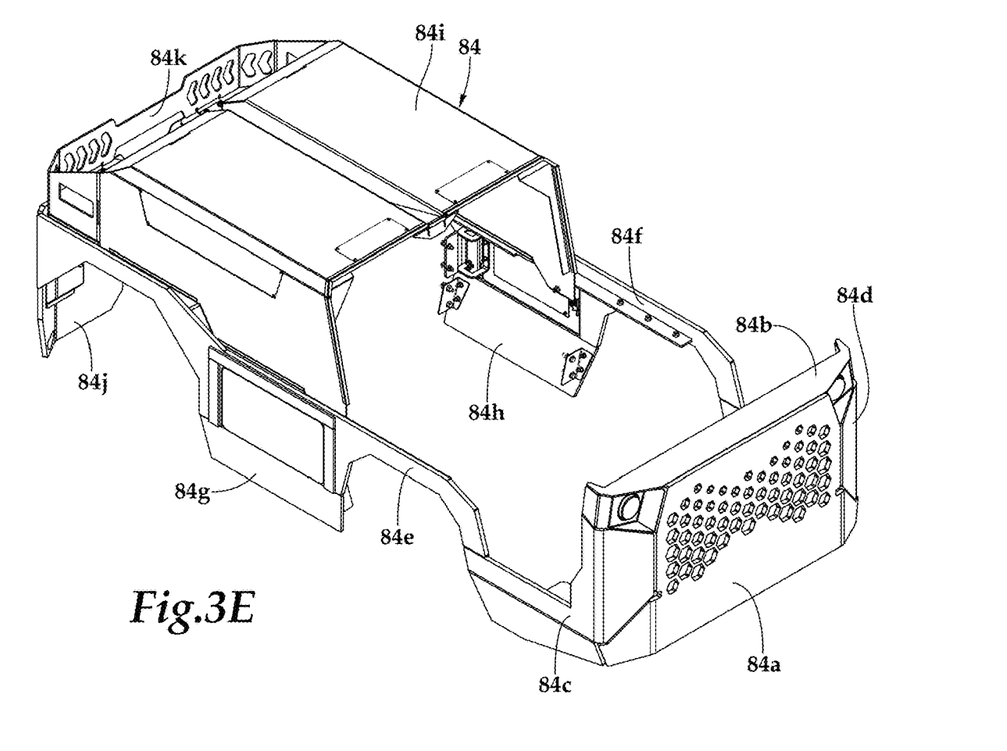

Referring to FIG. 3E of the drawings, details of body panels 84 positioned in a cab forward orientation will now be described. In the illustrated embodiments, body panels 84 include a front bumper 84a, a headlight bezel 84b, a right front quarter panel 84c, a left front quarter panel 84d, a right side panel 84e, a left side panel 84f, a right side skirt 84g, a left side skirt 84h, a battery cover 84i, a rear bumper 84j and a rear storage rail 84k. Each of body panels 84 is preferably a single integral plate member but could alternatively be formed from multiple plate sections that are coupled together or separately coupled to common wheeled chassis 26. As another alternative, more than one of the recited body panels 84 could be formed as a single integral plate member.

Figure 3F:
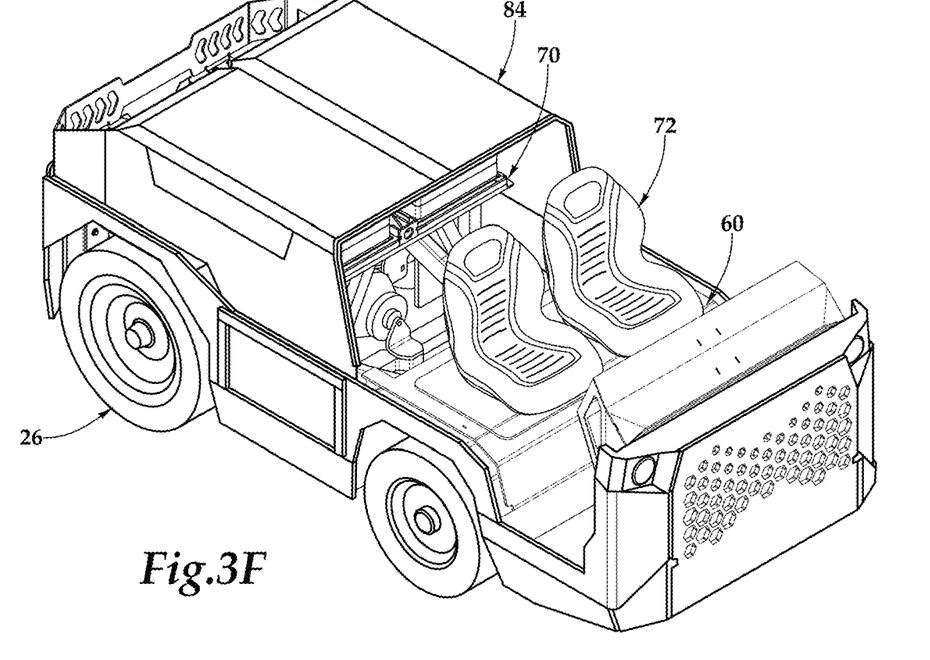

Body panel 84 are comprised of metal or metal alloy, such as steel or aluminum. Body panels 84 and body panels 74 share some common members such the right side skirts, the left side skirts and the rear bumpers. As these body panels may be installed for the cab forward configuration or the cab aft configuration of a ground support tractor, these body panels may be referred to as common body panels. Other body panels 84 are unique to the cab forward orientation such as front bumper 84a, quarter panels 84c, 84d, side panels 84e, 84f, battery cover 84i and rear storage rail 84k. Likewise, certain body panels 74 are unique to the cab aft orientation such as front bumper 74a, the front fenders, hood 74d, the cab steps, rear fenders 74g, 74h and service access panel 74j. As best seen in FIG. 3F of the drawings, body panels 84 are coupled to common wheeled chassis 26 using bolts or other suitable fastening means to provide an outer skin for the ground support tractor that protects the various operating components of the ground support tractor disposed therein. As best seen in FIG. 3G of the drawings, a cabin 76 has been installed on common wheeled chassis 26 which completes the assembly of ground support tractor 86 having a cab aft configuration. As cabin 76 may be installed for the cab forward configuration or the cab aft configuration of a ground support tractor, cabin 76 may be referred to as a common cabin.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A ground support tractor having cab forward and cab aft configurations, the ground support tractor comprising:
   a common chassis having a forward mounting location and an aft mounting location;
   a drivetrain coupled to the common chassis; and
   a battery system coupled to the common chassis;
   wherein, in the cab forward configuration, the battery system is coupled to the aft mounting location and positioned above the drivetrain; and
   wherein, in the cab aft configuration, the battery system is coupled to the forward mounting location and positioned forward of the drivetrain.

2. The ground support tractor as recited in claim 1 wherein, the drivetrain further comprises an electric motor and a transaxle coupled to the electric motor.

3. The ground support tractor as recited in claim 2 further comprises first and second drive wheels operably coupled to the transaxle.

4. The ground support tractor as recited in claim 3 wherein, in the cab forward configuration, the battery system is positioned above the first and second drive wheels; and
   wherein, in the cab aft configuration, the battery system is positioned forward of the first and second drive wheels.

5. The ground support tractor as recited in claim 3 wherein, the common chassis further comprises a frame with first and second forward wheel wells coupled thereto and with first and second aft wheel wells coupled thereto; and
   wherein, the first and second drive wheels are respectively positioned within the first and second aft wheel wells.

6. The ground support tractor as recited in claim 5 wherein, the forward mounting location is positioned above the first and second forward wheel wells; and
   wherein, the aft mounting location is positioned above the first and second aft wheel wells.

7. The ground support tractor as recited in claim 5 wherein, in the cab forward configuration, the battery system is positioned above the first and second aft wheel wells; and
   wherein, in the cab aft configuration, the battery system is positioned above the first and second forward wheel wells.

8. The ground support tractor as recited in claim 5 further comprises first and second steering control wheels respectively positioned within the first and second forward wheel wells.

9. The ground support tractor as recited in claim 8 wherein, in the cab forward configuration, the battery system is positioned aft of the first and second steering control wheels; and
   wherein, in the cab aft configuration, the battery system is positioned above the first and second steering control wheels.

10. The ground support tractor as recited in claim 8 wherein, in the cab forward configuration, the battery system is positioned above the first and second drive wheels; and
    wherein, in the cab aft configuration, the battery system is positioned above the first and second steering control wheels.

11. The ground support tractor as recited in claim 5 further comprising a motor mount coupled to the frame between the forward wheel wells and the aft wheel wells;
    wherein, the electric motor is coupled to the motor mount.

12. The ground support tractor as recited in claim 5 further comprising a rear suspension coupled to the frame;
    wherein, the transaxle is coupled to the rear suspension.

13. The ground support tractor as recited in claim 5 wherein, the transaxle is positioned between the first and second aft wheel wells.

14. The ground support tractor as recited in claim 1 wherein, the drivetrain is a common drivetrain.

15. The ground support tractor as recited in claim 1 wherein, the battery system is a common battery system.

16. The ground support tractor as recited in claim 1 wherein, the battery system includes at least first and second battery packs.

17. The ground support tractor as recited in claim 1 further comprising a battery rack coupled to the common chassis;
    wherein, the battery system is coupled to the battery rack.

18. A ground support tractor having cab forward and cab aft configurations, the ground support tractor comprising:
    a common chassis including a frame with first and second forward wheel wells coupled thereto and with first and second aft wheel wells coupled thereto, the common chassis having a forward mounting location positioned above the first and second forward wheel wells and an aft mounting location positioned above the first and second aft wheel wells;
    a drivetrain coupled to the common chassis; and
    a battery system coupled to the common chassis;
    wherein, in the cab forward configuration, the battery system is coupled to the aft mounting location and positioned above the drivetrain; and
    wherein, in the cab aft configuration, the battery system is coupled to the forward mounting location and positioned forward of the drivetrain.

19. The ground support tractor as recited in claim 18 further comprising:
    first and second steering control wheels respectively positioned within the first and second forward wheel wells; and
    first and second drive wheels respectively positioned within the first and second aft wheel wells.

20. The ground support tractor as recited in claim 19 wherein, in the cab forward configuration, the battery system is positioned above the first and second drive wheels and aft of the first and second steering control wheels; and wherein, in the cab aft configuration, the battery system is positioned forward of the first and second drive wheels and above the first and second steering control wheels.

* * * * *